Patented Sept. 7, 1954

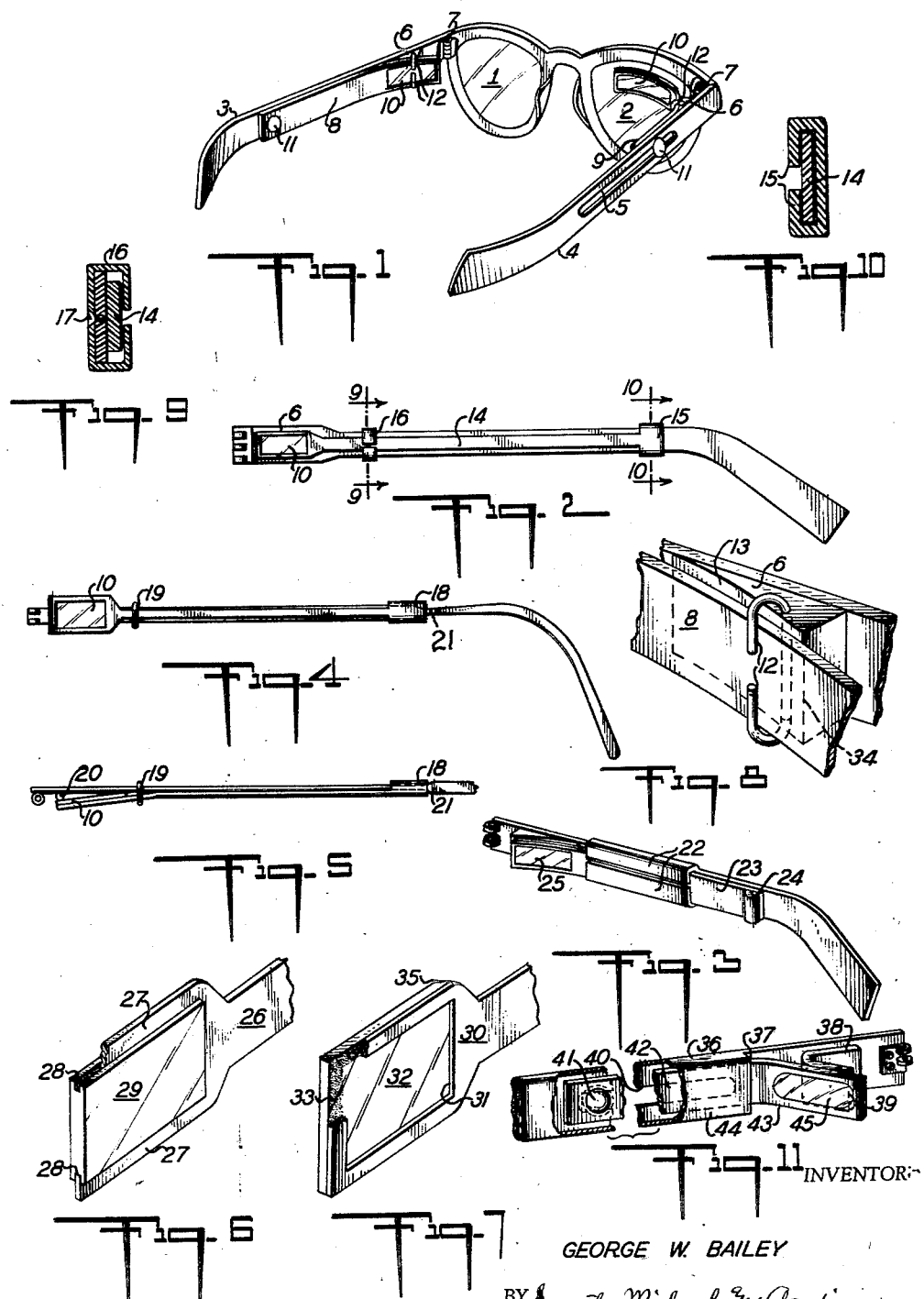

2,688,272

UNITED STATES PATENT OFFICE 2,688,272

ATTACHMENT FOR SPECTACLES

George W. Bailey, Ogdensburg, N. Y.

Application March 25, 1953, Serial No. 344,598

13 Claims. (Cl. 88—41)

This invention is an attachment for spectacles by which an auxiliary, light-transmitting member may be operatively disposed within the field of the main lenses of the spectacles if desired, and which may be moved to an inoperative, inconspicuous position out of the field of vision of the main lenses, when not in use.

It is well recognized by those who wear multiple-focal lenses to correct their vision that in particular instances it is desirable to have a substantially unlimited area of vision when viewing objects at a distance. This is particularly true of those who engage in automobile driving, boating, fishing, hunting, and other vocations wherein objects with which the person is most concerned are at a considerable distance from the eyes. Under these conditions, lenses which are provided with intermediate focal areas present a decided handicap to the individual in that the area of vision for distant objects is substantially reduced. The present invention seeks to remedy this condition by providing in a pair of spectacles an auxiliary, light-transmitting member movably mounted in a manner to place it in operative position within the field of the main lenses of the spectacles when desired, but which may be moved entirely out of the field of the main lenses when the restricted range of vision provided thereby is not desirable.

More particularly, the invention provides an attachment of the character described by which the auxiliary, light-transmitting members may be slidingly mounted upon the temple bars of the spectacles in a manner such that they may be moved fore and aft along the temple bars in a manner to project the light-transmitting members inwardly within the field of the main lenses or to retract them out of the field of such lenses.

The invention contemplates the use of flexible, carrier members for the auxiliary, light-transmitting members and the flexible carrier members are mounted in general parallelism with the temple bars and may be slidingly moved fore and aft with respect thereto.

Another object of the invention is to provide in connection with a flexible carrier for an auxiliary, light-transmitting member of the character described, means which will flex the carrier member inwardly as it is moved forwardly to direct the auxiliary, light-transmitting member transversely of the optical axis of the main lenses.

The invention also contemplates the provision of suitable guide means for maintaining the flexible carrier member in general parallelism with the temple bars and also means for defining the forward position of the carrier members so that the auxiliary, light-transmitting members are disposed operatively within the field of the main, optical lenses.

Another object of the invention is to provide an attachment of the character described which may be readily and operatively associated with spectacles having either plastic or metal frames.

The invention further contemplates that the auxiliary, light-transmitting members carried by the flexible carrier members may be lenses having definite optical properties as required by the person using the same, or the auxiliary, light-transmitting members may be merely colored to provide protection from sun glare, automobile headlights, and the like.

These and other objects of the invention will become apparent from a consideration of the following specification, read in the light of the accompanying drawings wherein preferred modifications of the invention are illustrated.

In the drawings

Fig. 1 is a perspective view of a pair of spectacles with my invention attached thereto, Fig. 2 is a modification of the invention as applied to a temple bar of different construction from that shown in Fig. 1, Fig. 3 is a perspective view of a further modification of the invention showing the flexible carrier mounted within a guideway formed by flanges carried by the temple bar, Fig. 4 is a side elevation of my invention as applied to a metallic temple bar, Fig. 5 is a top plan view of the modification shown in Fig. 4 with a part of the temple broken away, Fig. 6 is a fragmental detail partly in section showing one manner of mounting a light-transmitting element on the carrier, Fig. 7 is a view similar to Fig. 6 of a further modification showing the light-transmitting member adhesively secured to the carrier member, Fig. 8 is an enlarged fragmental detail showing in perspective the details of construction incident to the flexing cam and guide means, Fig. 9 is an enlarged, sectional view taken on the line 9—9 of Fig. 2, Fig. 10 is an enlarged, sectional view taken on the line 10—10 of Fig. 2, and Fig. 11 is a fragmentary, perspective view of a modified form of the invention.

As shown in Fig. 1, the auxiliary attachment of my invention is operatively associated with a pair of spectacles, the frames and temple bars of which are made of relatively heavy plastic material, in accordance with the currently popular models. The spectacles generally comprise main lenses 1 and 2 and temple bars 3 and 4. temple bars are longitudinally slotted as shown at 5, and each is provided with a cam or block member 6, said cam members being positioned on the inner faces of the temple bars near their forward ends and adjacent to the hinge pivots 7 by which the temple bars are pivotally connected to the spectacle frame. A flexible carrier strip is movably associated with each temple bar and these strips are designated 8 and 9 and are shown carrying auxiliary, light-transmitting elements 10 at their forward extremities. The flexible carrier strip 8 is shown in Fig. 1 in its retracted position, while the flexible carrier strip 9 is shown in its forward extended position, in which position the auxiliary, light-transmitting member 10 thereof is operatively disposed within the field of the main lens 2. In order to maintain the carrier strips 8 and 9 in general parallelism with the respective temple bars 3 and 4, the carrier strips are each provided with a headed pin 11 which extends through and slidingly engages the respective slots 5 in the temple bars. Further guide means for the carrier strips are provided at the forward ends of the temple bars in the form of inturned, opposed, hook members 12 which embrace the upper and lower longitudinal edges of the respective carrier strips 8 and 9 to retain these strips in operative position with respect to the cams 6, previously referred to. The blocks 6 for flexing the carrier strips may conveniently be made of plastic material and fused to the inner faces of the temple bars. The hook members 12 may, as shown in Fig. 8, be imbedded or molded within the body of the blocks 6.

The auxiliary, light-transmitting elements 10 may be secured to or mounted upon the ends of the respective carrier strips 8 and 9 in any convenient manner, such as shown in Figs. 6 and 7 to which more particular reference will be made hereinafter. The carrier strips 8 and 9 carrying the auxiliary, light-transmitting elements 10 may be made of any suitable material such as metal or plastic (synthetic resin, celluloid, pyroxylin, and the like, and possess sufficient flexibility such that when a carrier strip is moved forwardly into the position of carrier strip 9 of Fig. 1, the cam member 6 associated therewith will function to flex and direct the carrier strip inwardly across the focal axis of the associated main lens, as clearly shown in Fig. 1. To this end, the cam member 6 is provided with an inclined or arcuate face 13 (see Fig. 8) which face underlies the flexible carrier. The face 13 in cooperation with the guide members 12 will flex and direct the associated carrier strip inwardly into engagement with the inner face of the associated main lens, and continued forward movement of the flexible carrier strip will move the associated auxiliary, light-transmitting member into the position shown in the right-hand lens of Fig. 1, with the auxiliary, light-transmitting member lying against the inner face of the main lens 2.

When it is not desired to use the auxiliary, light-transmitting element, the associated carrier strip may be retracted to the position occupied by carrier strip 8 in Fig. 1, in which position the auxiliary, light-transmitting member thereof is moved entirely out of the field of the associated lens and into a position parallel with, behind, and substantially concealed by the associated temple bar. If desired, the length of the slots 5 may be so arranged as to cooperate with the headed pins 11 in a manner such that said pin, engaging opposite ends of the slot, will define the fully extended or fully retracted position of the associated auxiliary, light-transmitting element.

Some persons have objections to spectacle frames of the heavy plastic type shown in Fig. 1, and prefer a plastic frame having temple bars of reduced width. With this in mind, I have shown in Fig. 2 a modified form of my invention by which the slotted construction of Fig. 1 may be avoided and flexible carrier strips may be slidingly mounted on temple bars such as 14, which are reduced in width throughout the major portion of their length, as clearly shown in the drawings. In this form of the invention, the carrier strip may be provided with integral guide hooks 15 which may be formed to embrace the shank of the temple bar as shown in Fig. 10, said guide hooks being disposed adjacent the rear end of the flexible carrier strip. In order to maintain operative relation of the carrier strip near its forward end with the cam 6, a split guide loop 16 may be secured to the temple bar by any convenient means, such as a screw or rivet 17 (see Fig. 9). By this expedient, the slotting of the temple bar is avoided, and a more slender, delicate temple bar may be utilized with which the guide hooks cooperate in the manner described.

In Figs. 4 and 5 I have shown a further modification of the invention wherein the temple bar is of metal in accordance with conventional practice. The construction here is similar to that employed in the modification shown in Fig. 2 in that the carrier strip is provided with a guide hook 18 at its rearward extremity and a guide loop 19, through which the flexible carrier strip passes, is carried by the temple bar near its forward end. In this form of the invention, the cam member for directing the flexible carrier and associated auxiliary, light-transmitting element inwardly across the field of the main lens is in the form of a short section of rounded bar or rod 20 against which the forward end of the flexible carrier lies when the carrier is in its retracted position. If desired, in this form of the invention, the temple bar may be provided with a shoulder 21 which functions as a stop means for the guide hook 18 carried by the flexible carrier strip when the latter is in its rearward or retracted position. This expedient maintains proper and cooperative relation of the forward end of the carrier strip and the cam bar 20, having in mind the limited fore and aft extent of the bar 20.

In Fig. 3, I have shown a further modification of the invention as applied to a temple bar formed with integral, inturned flanges 22 designed to provide a runway within which the flexible carrier strip 23 is mounted. In this form of the invention, due to the longitudinal extent of the flange members 22—22, it is not necessary to provide guide hooks 12 of the modification shown in Figs. 1 and 8. In this form of the invention, there is provided an abutment 24 carried by the rear end of the carrier strip, and it is positioned with respect to the rear terminal portions of the flanges 22 so as to define the extreme forward position of the carrier strip when the abutment engages said flanges. This insures the proper disposition of the auxiliary, light-transmitting unit 25 with respect to the associated main lens.

As previously stated, any convenient means may be employed for attaching the auxiliary, light-transmitting members to the carrier strips. In Fig. 6 I have shown one convenient means of attaching the auxiliary, light-transmitting members. In this modification the carrier strip 26 is provided with a bifurcated extremity, the arms 27 of the bifurcation straddling and interfitting within grooves 28 formed in the longitudinal edges of the auxiliary, light-transmitting element 29. If desired, the inside edges of the grooves 28 may be coated with adhesive as shown to enhance the attachment of the light-transmitting element to the flexible carrier 26.

In Fig. 7 the carrier strip 30 is provided with an aperture or window 31 in its forward extremity and the auxiliary, light-transmitting element 32 is secured to one face of the carrier strip by adhesive 33. As previously stated, the auxiliary, light-transmitting elements may be in the form of spectacle lenses or merely colored filters or screens, and in either instance may be made of glass or transparent or colored plastic material, and in instances where both the carrier strip and the auxiliary, light-transmitting element are plastic, the union between these elements may be formed by fusing the adjacent surface portions thereof. Any convenient means may be employed for insuring continued and free gliding movement of the carrier strip and light-transmitting unit through and beyond the forward guide means such as the hooks 12 of Fig. 8 and to this end the edge 34 of the cam block 6 and the rear edge of the light-transmitting element as shown at 35 in Fig. 7 may be cooperatively rounded as shown to facilitate passage of these members, particularly on the rearward movement of the carrier strip. Although Fig. 7 of the drawings shows the auxiliary, light-transmitting member secured to the inner face of the flexible carrier strip, it is to be understood that if desired, the light-transmitting member may be secured to the outer face of the strip, or, as shown in Fig. 6, may be mounted so that the central plane of the light-transmitting member is substantially coincident with the central plane of the carrier strip.

In Fig. 11 I have shown the modified form of the invention in which the temple bar 36 is made of flattened, tubular stock such as sheet metal or plastic material. The inner wall of the tubular temple bar is cut away at its forward end as shown at 37 and a cam block 38 is secured to the exposed inner face of the outer wall as shown. The cam 38 in this instance is shown in the form of a bent portion of sheet material to provide the inclined guiding surface 39. The outer wall of the tubular temple bar is slotted as shown at 40 and in said slot rides a pin or stud 41 carried by the flexible strip 42 housed within the tubular temple bar and arranged to slide fore and aft therein. The forward end 43 of the strip 42 projects through the opening formed at 37 where the inner wall of the tubular temple bar has been cut away and overlies the inclined face 39 of the cam member 38. By this construction, the slide member 42 and the stud 41 are covered by the inner wall 44 of the tubular temple bar, and thus the temple and head of the wearer of the spectacles are not subject to objectionable rubbing or abrasion due to sliding movement of the carrier with respect to the temple bar.

If desired, the plastic "carrier" strip itself may be made to serve as a light filter or screen by employing appropriately colored plastic material for said strip; or the flexible "carrier" strip itself may have outer free end portions so shaped or molded as to serve as a corrective lens, as shown at 45 in Fig. 11, and thus avoid the necessity of attaching to said strip a separate light-transmitting unit.

From the foregoing, it is apparent that my invention comprises a flexible carrier strip for an auxiliary, light-transmitting element slidingly mounted upon the temple bar of an optical frame and movable into a forward operative position and a rear inoperative position in which latter position the carrier and auxiliary, light-transmitting unit lie substantially concealed behind the temple bar. When it is desired to employ the auxiliary, light-transmitting unit, the associated carrier bar may be readily moved forwardly on the temple bar without taking the spectacles from the head of the wearer, and the stop means provided insures proper disposition of the auxiliary viewing unit with respect to the field of the main lenses.

It will be understood that while I have shown in Fig. 1 both temple bars provided with an attachment including a flexible carrier and an auxiliary, light-transmitting unit, if desired only one such carrier and unit may be associated with the spectacle frame, since in some lines of work an auxiliary lens is employed in connection with only one eye of the worker. This is common practice with jewelers and watchmakers.

It will be understood that while I have shown and described preferred modifications of my invention, changes may be made in size and proportions of parts, if desired, within the scope of the invention as defined in the appended claims.

I claim:

1. In a spectacle, in combination, a spectacle frame provided with a pair of main lenses and a pair of temple bars, each temple bar being secured at its forward end to said spectacle frame, a light-transmitting member movably associated with at least one temple bar, means mounting the light-transmitting member for sliding, fore and aft movement on said one temple bar, said mounting means including an elongated, flexible carrier member, to the forward end of which the light-transmitting member is secured, guide means cooperatively engaging the temple bar and the flexible carrier member for retaining said bar and member in general parallelism, means on the spectacle and engaged by said flexible carrier member to flex the carrier member and direct the forward end thereof and the light-transmitting member carried thereby inwardly across the field of the adjacent main lens, when the flexible carrier member is moved forwardly to an extended position.

2. The spectacle described in claim 1 wherein the means to flex the flexible carrier member comprises a protuberance on the inner face of the temple bar adjacent to the point of connection thereof with the spectacle frame, and underlying said flexible carrier member thereby to deflect the forward end of said flexible carrier member inwardly across the field of the adjacent main lens when the flexible carrier member is moved forwardly.

3. The spectacle described in claim 1 wherein the means to flex said flexible carrier member comprises a generally wedge-shape cam block secured to the inner face of the temple bar near its forward end, said wedge-shape cam block presenting a forwardly and inwardly inclined surface underlying the flexible carrier member and serving to flex said flexible carrier member and to direct the light-transmitting member carried thereby inwardly across the field of the adjacent main lens when the flexible carrier member is moved forwardly to its extended position.

4. The spectacle described in claim 3 wherein the guide means includes a pair of opposed, inturned, generally hook-shaped members carried by said wedge block and positioned to embrace the upper and lower edges of the flexible carrier member to maintain the same in operative relation with the block during fore and aft sliding movements of the flexible carrier member.

5. The spectacle as described in claim 1 wherein the guide means includes a headed pin secured to the rear end of the flexible carrier member and engaged within a longitudinally extending slot provided in the temple bar.

6. The spectacle as described in claim 1 wherein the guide means includes a headed pin secured to the rear end of the flexible carrier member and engaged within a longitudinally-extending slot provided in the temple bar, and spaced guide members carried by the temple bar near its forward end having portions formed to embrace the upper and lower longitudinal edges of the flexible carrier member.

7. The spectacle as described in claim 1, wherein the temple bar is provided with elongated, inturned, longitudinally-extending guide flanges along its upper and lower edges defining a channel within which the flexible carrier member is slidingly mounted.

8. The spectacle as described in claim 1 wherein the guide means for retaining the flexible carrier member and temple bar in general parallelism comprises longitudinally-spaced pairs of guide tongues, the tongues of the rearmost pair being carried by the flexible carrier member and embracing the upper and lower longitudinal edges of the temple bar and the foremost pair of guide tongues being carried by the temple bar and embracing the upper and lower longitudinal edges of the flexible carrier member.

9. The spectacle described in claim 1 wherein means are provided on the flexible carrier member and temple bar for limiting the forward movement of the flexible carrier member, said means including an abutment carried by one of said members and a stop formation on the other of said members, said abutment engaging the stop formation in the extreme forward position of the flexible carrier member thereby properly to position the light-transmitting member carried thereby within the field of the main lens.

10. In a spectacle, in combination, a spectacle frame provided with a pair of main lenses and a pair of temple bars, each temple bar being pivotally secured at its forward end to said spectacle frame, a light-transmitting member movably associated with each temple bar, means mounting the light-transmitting members for sliding, fore and aft movement on the respective temple bars, each mounting means including an elongated, flexible carrier member, to the forward end of which the light-transmitting member is secured, guide means cooperatively engaging the temple bar and the flexible carrier member for retaining said bar and member in general parallelism, means on the spectacle and engaged by said flexible carrier member to flex the carrier member and direct the forward end thereof and the light-transmitting member carried thereby inwardly across the field of the adjacent main lens, when the flexible carrier member is moved forwardly to an extended position.

11. In combination, a temple bar for spectacle frames, an elongated, flexible, carrier member slidably mounted thereon for fore and aft movement with respect thereto, a light-transmitting member carried by said carrier member near the forward end thereof, guide means operatively associated with the temple bar and flexible carrier member to maintain the same in general parallelism during fore and aft movement of the flexible carrier member, and means near the forward end of the temple bar for flexing the flexible carrier member as it is moved forwardly to direct the light-transmitting member carried thereby laterally and inwardly of the temple bar.

12. In combination, a temple bar for spectacle frames, an elongated, flexible strip of plastic material slidably mounted thereon for fore and aft movement with respect thereto, said plastic strip having a light-transmitting portion near the forward end thereof, guide means operatively associated with the temple bar and the flexible strip to maintain the same in general parallelism during fore and aft movement of said strip, and means near the forward end of the temple bar for flexing said strip as it is moved forwardly to direct the light-transmitting portion thereof laterally and inwardly of the temple bar.

13. In combination, a hollow temple bar for spectacle frames, the outer wall of said temple bar being provided with an elongated, longitudinally-extending slot, an elongated, flexible strip slidably mounted within the tubular temple bar for fore and aft movement with respect thereto, a stud carried by said strip and projecting through said slot for manipulation of said strip within the temple bar, the inner wall of the temple bar being provided with an opening through which the forward end of the flexible strip projects, and a cam member carried by the temple bar and underlying the projecting forward end of the strip to direct said strip laterally and inwardly of the temple bar when the strip is moved forwardly with respect to the temple bar.

No references cited.